Patented Feb. 15, 1949

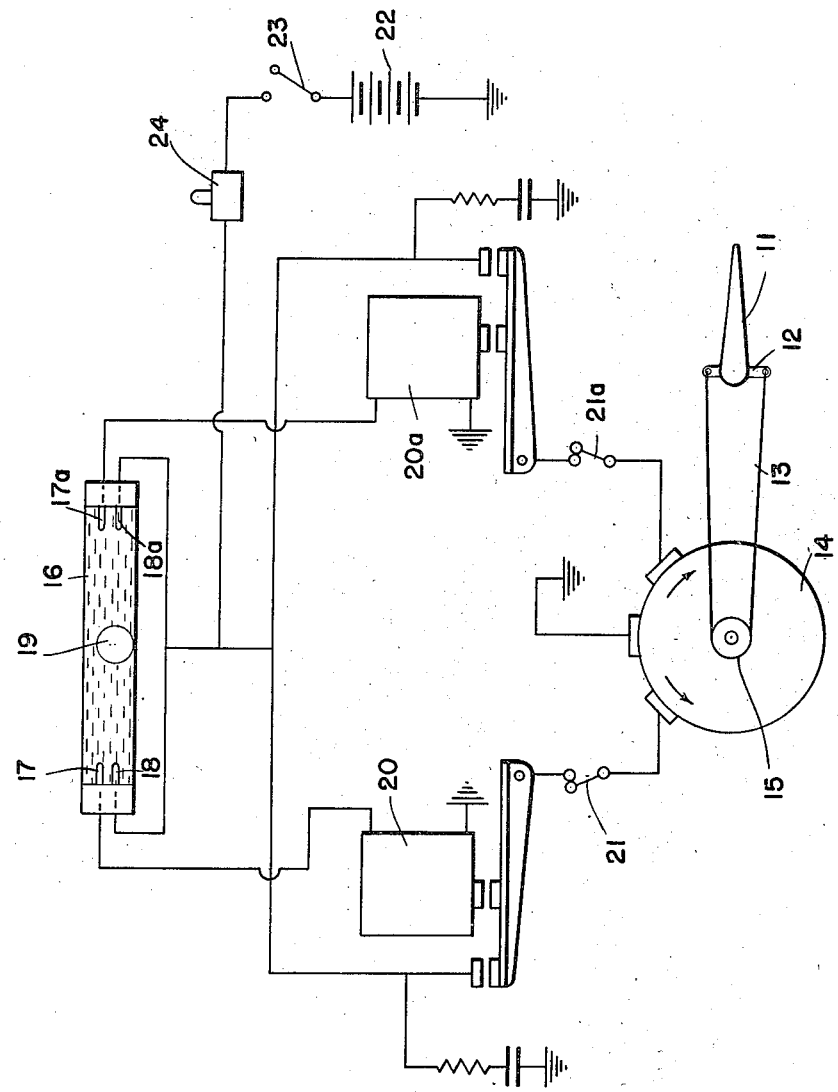

2,461,533

UNITED STATES PATENT OFFICE 2,461,533

AUTOMATIC SKID CORRECTOR

Robert G. Dosé, United States Navy,
Chevy Chase, Md.

Application February 4, 1946, Serial No. 645,429

2 Claims. (Cl. 318—489)

(Granted under the act of March 3, 1883, as
amended April 30, 1928; 370 O. G. 757)

The present invention relates to new and useful improvements in flight control mechanism for aircraft, and more particularly to such improvements in means for shifting one or more of the flight control surfaces in order to maintain a properly trimmed flight attitude of the aircraft, with respect to the coordination of the rudder and aileron.

In maneuvering high speed airplanes, particularly in the case of military or naval planes when approaching bombing, torpedo, rocket, or gunnery runs, it is desirable and important that the pilot be relieved of as much manual control as is possible under the circumstances. In addition, an out-of-trim condition of the airplane will materially affect accuracy. In a left turn, a "skidding" condition will result if the right wing is not banked high enough and "side-slipping" will result from an over-banked condition. The airplane is then in an out-of-trim condition. Correction of the skidding condition may be made by applying left aileron or right rudder. The converse is true in the case of a slipping condition. In dive bombing or other diving runs, it is sufficient to apply the corrective force to the rudder, or preferably to the rudder trim tab and the invention is illustrated diagrammatically in this connection.

In order to obviate the necessity for the pilot to observe an out-of-trim condition and to effect manual control thereof, one of the principal objects of the present invention is to provide means operable for correcting the flight attitude of an airplane when out of trim by shifting one of the control surfaces to compensate for such a condition.

Another object of the invention is to effect the application of the proper trim to the rudder, rudder trim tab, or other flight control surface by mechanism which is brought into operation when the airplane reaches an out-of-trim condition.

A still further object of the invention is to provide a flight control mechanism of the above type which is relatively simple in construction and reliable and accurate in operation.

The above and other objects of the invention will in part be obvious and will be hereinafter more fully pointed out.

In the accompanying drawing the figure is a diagrammatical and schematic view showing the control mechanism for a rudder trim tab.

Referring more in detail to the accompanying drawing, the rudder of an airplane is provided with a trim tab 11 hingedly connected thereto in a conventional manner. Shifting of the trim tab 11 may be effected by any suitable form of connection but for purposes of illustration, a double arm lever 12 is connected to the trim tab and also by means of cables 13 or the like to a driving motor 14. Preferably, the driving connection between the motor and the trim tab should include some type of slip or clutch mechanism 15 so as to enable the tab to be manually controlled if the automatic mechanism fails and such a drive may conveniently be in the form of a solenoid controlled device which is adapted to cause the clutch mechanism to be engaged when the motor circuit is energized. Any form of motor-driving mechanism may be employed, but in the case of an electric motor, as illustrated, a suitable form of brake may be desirable to prevent the motor from overrunning or coasting when the circuit is broken.

A simple form of electric diagram has been illustrated and will now be described in connection with the starting and stopping of the reversible motor 14. In order to start the motor in one direction or the other, there is provided a device which will respond to an out-of-trim condition of the airplane to initiate operation of the motor upon the application thereto of a lateral thrust with respect to the airplane. For this purpose, there is provided a tubular casing 16 having, at the ends thereof, leads 17, 18, and 17a, 18a which are adapted to be closed when they become imbedded in a globule 19 of mercury or other suitable conducting material. Preferably, the tubular casing is filled with a damping liquid so that rapid movements of the mercury globule within the casing are prevented. However, under a steady thrust, shifting of the mercury ball will be effected. It will be appreciated that any device which can detect the lateral thrust or tilting which obtains under skidding conditions will be suitable for this mechanism. For instance, a mechanical pendulum arrangement might be readily employed as a switch to complete the right and left circuits.

The circuit between the leads 17, 17a and the motor include conventional relays 20, 20a for the purpose of stepping up the current. Also included in the circuit are left and right limit switches 21, 21a each of which prevents overriding of the driving mechanism in its direction of travel. These switches may be actuated by a linkage system in the drive mechanism so as to break the circuit in that direction when the limit of movement of the control surface in either direction is reached. The other leads 18, 18a are also connected with the airplane source of electric current 22. In the line from the source, there is provided a manual switch 23 which may be in the form of a multi-way switch for setting the system for automatic and off positions and also for manual starting of the motor for left or right movement of the tab for turning the system on or off and also a conventional circuit breaker 24. When the airplanes are used for carrier take-offs or where the landing field is not level, it is desirable to provide a ground switch 25 that will operate upon contact with the landing surface to break the circuit.

From the foregoing description, it will be seen that a relatively simple mechanism is herewith provided for effecting automatic shifting of the rudder trim tab, as illustrated, or other flight control surfaces, for correcting the flight attitude of the airplane upon its reaching an out-of-trim or skidding condition. Thus, in a left turn when the right wing is not banked high enough, the airplane will tend to skid outwardly and this will result in a lateral thrust on the mercury globule tending to shift the same towards the leads 17, 18, so as to close the circuit which will initiate operation of the motor shaft in a counterclockwise direction, as viewed in the drawing. This operation of the motor will apply a corrective right movement to the trim tab 10 so as to maintain the airplane in a trimmed condition. As previously pointed out, this operation of the trim tab is entirely automatic so that the pilot is relieved of all manual control.

It is to be clearly understood that various changes in the details of construction, arrangement of parts and mode of operation may be accomplished without departing from the scope of the invention as set forth in the appended claims.

The invention described herein may be manufactured and used by or for the Government of the United States of America for governmental purposes without the payment of any royalties thereon or therefor.

I claim:

1. A skid corrector for aircraft comprising a source of electric current, a rotatable reversible electric motor, adapted to selectively shift a flight control surface in either direction, circuit means connecting the motor and source, and a switch mechanism in the circuit means and including a mercury globule movable in opposite directions to selected circuit closing positions in response to skidding of the aircraft for starting the motor in one direction or the other whereby to cause selective movement of the control surface in a direction to correct the skidding condition of the aircraft.

2. A skid corrector, as claimed in claim 1, wherein the switch mechanism includes a closed casing having circuit closing contacts at opposite ends thereof, and a mercury globule in the casing and movable in opposite directions in response to skidding of the aircraft for closing one or the other of said contacts whereby to operate the motor in one direction or the other.

ROBERT G. DOSÉ.

REFERENCES CITED

The following references are of record in the file of this patent:

UNITED STATES PATENTS

| Number | Name | Date |
| --- | --- | --- |
| 481,386 | Baxter | Aug. 23, 1892 |
| 1,658,013 | Armstrong et al. | Dec. 16, 1922 |
| 1,866,596 | Hendrickson | July 12, 1932 |